United States Patent [19]

Buyan et al.

[11] Patent Number: 4,714,541
[45] Date of Patent: Dec. 22, 1987

[54] METHOD AND APPARATUS FOR IMPROVING CYCLONE EFFICIENCY

[75] Inventors: Frank M. Buyan, Yardley, Pa.; Mark S. Ross, Lawrenceville, N.J.

[73] Assignee: Mobil Oil Corporation, New York, N.Y.

[21] Appl. No.: 801,102

[22] Filed: Nov. 22, 1985

[51] Int. Cl.$^4$ .................. F27B 15/08; C10G 35/14
[52] U.S. Cl. .................... 208/161; 208/153; 208/113; 422/144; 55/459 R
[58] Field of Search .............. 208/113, 147, 153, 156, 208/161, 164; 422/144, 147; 55/339, 449, 459 R, 345, 451, 460; 210/512.1

[56] References Cited

U.S. PATENT DOCUMENTS

| | | | |
|---|---|---|---|
| 3,064,811 | 11/1962 | Mumper | 55/459 R |
| 3,790,143 | 2/1974 | Vix | 55/345 X |
| 4,219,442 | 8/1980 | Vickers | 208/113 X |
| 4,244,716 | 1/1981 | Duske | 55/460 X |
| 4,394,349 | 7/1983 | Cartmell | 422/147 |

Primary Examiner—Patrick P. Garvin, Sr.
Assistant Examiner—Glenn Caldarola
Attorney, Agent, or Firm—Alexander J. McKillop; Michael G. Gilman; Malcolm D. Keen

[57] ABSTRACT

Disclosed is a method and apparatus for improving the efficiency of a cyclone by the addition of a rough-cut device to a gas outlet tube of the cyclone. The rough-cut device includes a tangentially located dust collector that gradually reduces in size and is connected to a dipleg that can be buried in a dense bed or provided with a trickle valve. Gases containing entrained solid particles exit the gas outlet tube of the cyclone in an upward flowing spiral with the solid particles held against the wall of the tube by the centrifugal force of the spiraling gas. When the solid particles reach the tangential exit port, the centrifugal force causes the particles to follow the direction of the wall leaving the gas stream and falling toward the dipleg due to the loss of the upward driving force of the gases. The gases continue in an upward direction and exit the top of the rough-cut device with fewer entrained solid particles. The gases are not required to change direction and, after separation, carry fewer entrained solids; therefore, the pressure drop through the rough-cut device is minimal.

33 Claims, 5 Drawing Figures

METHOD AND APPARATUS FOR IMPROVING CYCLONE EFFICIENCY

BACKGROUND OF THE INVENTION

1. Field of the Invention

This invention relates to a method and apparatus for improving the separation efficiency of a cyclone. More particularly, it relates to an improved method and apparatus for separating solids from gases discharged from the overhead tube of a cyclone. The method and apparatus is especially useful under fluid catalytic cracking conditions and for retrofitting existing cyclones.

2. Discussion of the Prior Art

Cyclones are the most widely used type of equipment for separating solid particles from gases. In the cyclone, solid particle-laden gas enters a cylindrical or conical chamber tangentialy at one or more points and leaves through a central opening. The entrance to the cyclone is usually rectangular. The solid particles, by virtue of their inertia, tend to move toward an outside cyclone wall from which they are led into a bin at the bottom of the cyclone. A cyclone is essentially a settling chamber in which gravitational acceleration is replaced by centrifugal acceleration. At common operating conditions, the centrifugal separating force or acceleration may range from 5 times gravity in very large diameter, low-resistance cyclones, to 2500 times gravity in very small, high-resistance units.

Cyclones have been employed to remove solids and liquids from gases and solids from liquids, and have been operated at temperatures as high as 1000° C. and pressures as high as 500 atmospheres. Cyclones generally remove solids from gases when particles of over 5 microns (0.0002 inches) outside diameter are involved, although some of the multiple-tube parallel units attain 80–85% efficiencies on particles of 3 micron outside diameter. In collecting particles of over 200 micron outside diameter, cyclones may be used, but gravity settling chambers are usually satisfactory. In special cases where the solid particles show a high degree of agglomeration, or where high solid particle concentrations (over 100 grams/cubic foot) are involved, cyclones will remove smaller solid particles. In certain cases, agglomeration results in efficiencies as high as 98% on solid particles having an ultimate particle size of 0.1 to 2 microns. Additional background on cyclones is available in *Perry's Chemical Engineers' Handbook*, Edited by Howard B. Crawford and Ross J. Kepler, 5th Edition, pages 20-81 to 20-87, McGraw-Hill (1973).

Cyclones are typically employed in fluid catalytic cracking (FCC) systems. Fluid catalytic cracking is the most important and widely used refinery process for converting heavy oils into more valuable gasoline and lighter products. Originally, cracking was accomplished thermally, but the catalytic process has almost completely replaced thermal cracking because more gasoline having a higher octane and less heavy oils are produced. The catalytic cracking processes in use today can be classified as either moving-bed or fluid-bed units. The fluid-bed units predominate and are termed fluid catalytic cracking. In fluid catalytic cracking, a hot oil feedstock is contacted with a catalyst in a riser. As the cracking reaction progresses, the catalyst is progressively deactivated by the formation of coke on the surface of the catalyst. The catalyst and hydrocarbon vapors are separated, and oil remaining on the catalyst is removed by steam stripping within a reactor vessel before the catalyst enters a regenerator vessel. The separated oil vapors are taken overhead to a fractionation tower for separation into streams having desired boiling ranges.

The catalyst leaving the fluid catalytic cracking reactor is termed "spent catalyst" and contains hydrocarbons which remain after stripping, and coke which adsorbs on its surface. In the regenerator, coke and any hydrocarbons are burned from the catalyst with air. The regenerator temperature and coke burnoff are controlled by varying the airflow rate. The cracking reaction is endothermic, and the regeneration reaction is exothermic. Typical fluidized catalytic cracking catalyst has an average particle size of 50 microns. Average reactor temperatures are above 950° F., with feedstock temperatures from 600° to 800° F., and regenerator exit temperatures for catalyst from 1100° to 1600° F. Regenerator temperatures are carefully controlled to prevent catalyst deactivation by overheating. This is generally done by controlling the airflow to give a desired $CO_2/CO$ ratio in the exit flue gases, as the burning to $CO_2$ does not remove additional coke from the catalyst, compared to burning to CO, but only produces excess heat. Additional information on fluid catalytic cracking can be found in *Petroleum Refining Technology and Economics*, by James H. Gary and Glenn E. Handwerk, pages 86–113, Dekker (1975) and U.S. Pat. No. 4,219,407 to Haddad et al.

Fluid catalytic cracking reactors typically employ cyclones to separate solids from gases exiting a riser conversion zone. The cyclones may be arranged in an open or closed system. In an open system, the hydrocarbons from the riser pass into the reactor vessel atmosphere prior to passing out of the reactor vessel. In a closed system, the hydrocarbons predominantly pass through the cyclone system without venting to the reactor vessel atmosphere. Closed cyclone systems are further described in U.S. Pat. No. 4,502,947 to Haddad et al, which is incorporated herein by reference.

The cyclones in fluid catalytic cracking reactors are typically arranged in single or multi-stage cyclone systems to separate gaseous hydrocarbons from catalyst particles. In the single stage cyclone, gas and catalyst particles enter through an inlet duct. Some particles are separated from the gas and exit the bottom of the cyclone. Some particles remain with the gas. The gas and remaining entrained solids leave the top of the cyclone through a gas outlet tube.

In many applications, a single stage cyclone does not provide the separation efficiency required. For these cases, two or more cyclones are connected in series. With this design, the gas and entrained particles exiting from the gas outlet tube of the first cyclone stage are directed to the inlet of the second cyclone stage. This can be achieved by the use of ducting or by locating the first cyclone gas outlet tube in open communication with the second cyclone inlet.

These single and multi-stage cyclone systems have several deficiencies. As stated above, when a single cyclone stage does not provide the separation efficiency required, it becomes necessary to add stages. The addition of a second or third stage increases the cost of installation. In addition, cyclones are typically located within a reactor vessel so additional space is required to house the additional cyclones. In the case of a high temperature, high pressure process, this adds significantly to the cost.

Another drawback is that as the particles progress from one cyclone stage to the next it becomes necessary to increase the cyclone efficiency in order to handle the smaller particle sizes that escape collection in the previous cyclone. With the current art, pressure drop through the cyclone increases when collection is increased. Increasing collection efficiency also increases dipleg length and horsepower required to move the gas and particles through the cyclone system.

Another problem occurs in the case of an existing installation when it becomes necessary to increase cyclone separation efficiency. With the present art, the cyclone stage must be added in the limited space of an existing catalytic cracking reactor. This can involve costly modifications and a compromised design.

Devices have been attached to cyclones to improve their efficiency. U.S. Pat. No. 4,244,716 to Duske discloses a skimmer secured to the top of a cyclone separator. The skimmer includes an outer cylinder forming an extension of the conventional air exhaust duct of the separator, and an inner concentric cylinder terminating within the lower end of the outer cylinder. The skimmer employs a spiral along its wall to direct fine dust-laden particles through a discharge opening. The device also employs a door to open and close the discharge opening. The inner and outer cylinders define an annular space aligned with the peripheral layer of upwardly moving air from the cyclone.

The device disclosed in U.S. Pat. No. 4,244,716 has a number of disadvantages. The spiral located within the skimmer device and the door for its discharge opening would not tolerate the hostile temperature conditions of a fluid catalytic cracking reactor vessel (greater than 950° F.). Furthermore, the device requires an inner cylinder which is concentric with the cyclone gas outlet tube, and has a narrower diameter than the cyclone gas outlet tube. This results in increased pressure drop for the cyclone gas outlet tube. Increasing pressure drop through the cyclone gas outlet tube decreases cyclone efficiency.

SUMMARY OF THE INVENTION

It is a primary object of this invention to provide an improved method and apparatus for separating solids from gases in spiral flow.

It is another object of the invention to provide a method and apparatus for attachment to a downstream end of a cyclone gas outlet tube through which a cyclone overhead stream, comprising solids and gases, pass in spiral flow.

It is another object of the invention to provide a method and apparatus for improving the separation efficiency of a cyclone located in a fluid catalytic cracking reactor vessel.

It is another object of the invention to provide a method for retrofitting an existing cyclone to improve its efficiency.

Addition of a rough-cut device of the present invention eliminates or reduces the above-mentioned problems. The rough-cut device can be attached to an existing single-stage cyclone or be attached in series with existing multi-stages of cyclones to improve overall collection efficiency in existing space requirements. The rough-cut device also improves overall collection efficiency with lower pressure drop compared to an additional stage. The gases passing through the device are not required to change direction and carry fewer entrained particles, and thus the pressure drop through the rough-cut device is minimal. The rough-cut device can also be part of a new, improved efficiency cyclone.

In its apparatus aspects, the invention achieves the foregoing objects by an apparatus for attachment to a downstream end of a cyclone gas outlet tube, through which a cyclone overhead stream comprising solids and gases pass in spiral flow, comprising:

a cylinder having an upstream end and a downstream end, wherein the cylinder has an inside diameter at least equal to an inside diameter of the cyclone tube, the cylinder being axially aligned and in communication with the cyclone tube and comprising sidewalls defining a tangential opening;

a solids collector conduit tangentially attached to the sidewalls at the periphery of the tangential opening; and a gas outlet conduit attached to the downstream end of the cylinder, the gas outlet conduit being axially aligned with the cylinder and having the same inside diameter as the cyclone tube.

The length of the cylinder ranges from one-half to two times the inside diameter of the cyclone tube. The arc of the tangential opening is at most one-fourth the circumference of the cylinder sidewalls. The length of the tangential opening may equal the length of the cylinder. The cylinder may have an inside diameter greater than 1.33 times that of the gas outlet tube. The cylinder may be spaced from the cyclone by a distance at least one fourth the cyclone tube inside diameter.

More particularly, in its apparatus aspects, the invention is a fluid catalytic cracking apparatus, comprising:

a fluid catalytic cracking reactor vessel;

a riser having a downstream end which terminates within the reactor vessel;

a cyclone located in the reactor vessel and including a cyclone top wall;

a cyclone gas outlet tube located in the reactor vessel and attached to the cyclone top wall, a portion of the cyclone tube extending above the cyclone top wall, thereby allowing a cyclone overhead stream comprising solids and gases to pass in spiral flow through the cyclone tube;

a cylinder located in the reactor vessel and including sidewalls attached to a cylinder top wall and a cylinder bottom wall, the cylinder bottom wall being attached to the cyclone tube, the cylinder being axially aligned with the cyclone and cyclone tube, the sidewalls defining a tangential opening, the cylinder being spaced from the cyclone top wall by a distance at least one-half an inside diameter of the cyclone tube, the cylinder having an inside diameter 1.33 to 1.5 times the inside diameter of the cyclone tube, the length of the cylinder ranging from one-half to one times the cyclone tube inside diameter;

a solid collector conduit located in the reactor vessel and attached to the perimeter of the tangential opening, wherein the arc of the tangential opening is at most one-fourth the circumference of the cylinder sidewalls, and wherein the solids collector conduit is tapered and attached to a dipleg; and a gas outlet conduit attached to the cylinder top wall, the gas outlet conduit being axially aligned with the cylinder and having the same inside diameter as the cyclone tube, wherein a portion of the gas outlet conduit is located within the cylinder.

In its method aspects the invention achieves the foregoing objects by a method for separating a cyclone overhead stream comprising solids and gases from a cyclone gas outlet tube having a first inside diameter, wherein the overhead stream passes in spiral flow through the cyclone tube, comprising the steps of:

passing the cyclone overhead stream comprising the solids and gases from the cyclone tube axially in spiral flow through a cylinder comprising sidewalls and having an inside diameter at least equal to that of the cyclone tube;

passing a separated solids stream comprising a portion of the solids tangentially out of the cylinder through a tangential opening in the cylinder sidewalls into a solids collector conduit attached to the periphery of the tangential opening; and passing a separated gas stream comprising a major portion of the gases and unseparated solids axially out of the cylinder into a gas outlet conduit attached to the cylinder, wherein the gas outlet conduit has an inside diameter equal to that of the cyclone tube.

More particularly, the invention comprises a method for separating solids from gases in a cyclone overhead stream which passes from a cyclone gas outlet tube having a first inside diameter, wherein the overhead stream passes in spiral flow through the cyclone tube, comprising the steps of:

passing the solids and gases, which later form the overhead stream, through a fluid catalytic cracking riser, under fluid catalytic cracking conditions;

passing the solids and gases, which later form the overhead stream, from the riser through a cyclone having a top wall;

passing the overhead stream upwardly from the cyclone in spiral flow about the cyclone's longitudinal axis, through a portion of the cyclone tube, which extends above the cyclone a distance of at least one-half the cyclone tube inside diameter, into a cylinder having sidewalls;

passing the overhead stream in spiral flow through the cylinder, wherein the cylinder has a length ranging from one-half to one times the cyclone tube inside diameter, the cylinder being axially aligned with the cyclone tube, the cylinder having an inside diameter 1.33 to 1.5 times the cyclone tube inside diameter and the cylinder being attached to the cyclone tube;

passing a separated solids stream comprising a portion of the solids tangentially out of the cylinder through a tangential opening in the sidewalls, into a solids collector conduit attached to the periphery of the tangential opening, wherein the arc of the tangential opening is at most one-fourth the circumference of the cyclone tube; and passing a separated gas stream comprising a major portion of the gases axially out of the cylinder into a gas outlet conduit attached to the cylinder, the gas outlet conduit having the same inside diameter as the cyclone tube.

The invention, in both its method and apparatus aspects above, can be configured as an original installation, or as a retrofit to an existing cyclone, particularly a fluid catalytic cracking cyclone, because its unique design can withstand the high temperatures of fluid catalytic cracking.

The invention also includes a method for improving the efficiency of an existing cyclone, comprising the steps of:

attaching a cylinder to a downstream end of a cyclone gas outlet tube, through which a cyclone overhead stream comprising solids and gases pass in spiral flow;

the cylinder having an upstream end and a downstream end wherein the cylinder has an inside diameter at least equal to an inside diameter of the cyclone tube, the cylinder being axially aligned with the cyclone tube and comprising sidewalls defining a tangential opening;

attaching a solids collector conduit tangentially to the sidewalls at the periphery of the tangential opening; and attaching an existing gas outlet conduit to the downstream end of the cylinder, the gas outlet conduit being axially aligned with the cylinder and having the same inside diameter as the cyclone tube.

More particularly, the invention provides a method for improving the efficiency of an existing cyclone located in a fluid catalytic cracking reactor vessel, the cyclone comprising a cyclone top wall and a cyclone gas outlet tube attached to the cyclone top wall, a portion of the cyclone tube extending above the cyclone top wall, thereby passing a cyclone overhead stream comprising solids and gases in a spiral flow through the cyclone tube comprising the steps of:

axially aligning a cylinder with the cyclone and cyclone tube;

attaching the cylinder to the cyclone tube, the cylinder being located in the reactor vessel and comprising sidewalls attached to a cylinder top wall and a cylinder bottom wall, wherein the cylinder bottom wall is attached to the cyclone tube, the sidewalls defining a tangential opening;

spacing the cylinder from the cyclone top wall by a distance at least one-half an inside diamter of the cyclone tube, fabricating the cylinder to have an inside diameter 1.33 to 1.5 times the inside diameter of the cyclone tube and to have a length ranging from one-half to one times the cyclone tube inside diameter;

locating a solids collector conduit in the reactor vessel and attaching the solids collector conduit to the perimeter of the tangential opening, wherein the cylinder is fabricated so that the arc of the tangential opening is at most onefourth the circumference of the cylinder sidewalls, wherein the solids collector conduit is tapered and attached to a dipleg;

axially aligning the gas outlet conduit with the cylinder; and attaching a gas outlet conduit to the cylinder top wall, wherein the gas outlet conduit has the same inside diameter as the cyclone tube, wherein a portion of the gas outlet conduit is located within the cylinder.

DETAILED DESCRIPTION OF THE INVENTION

Figure 1:
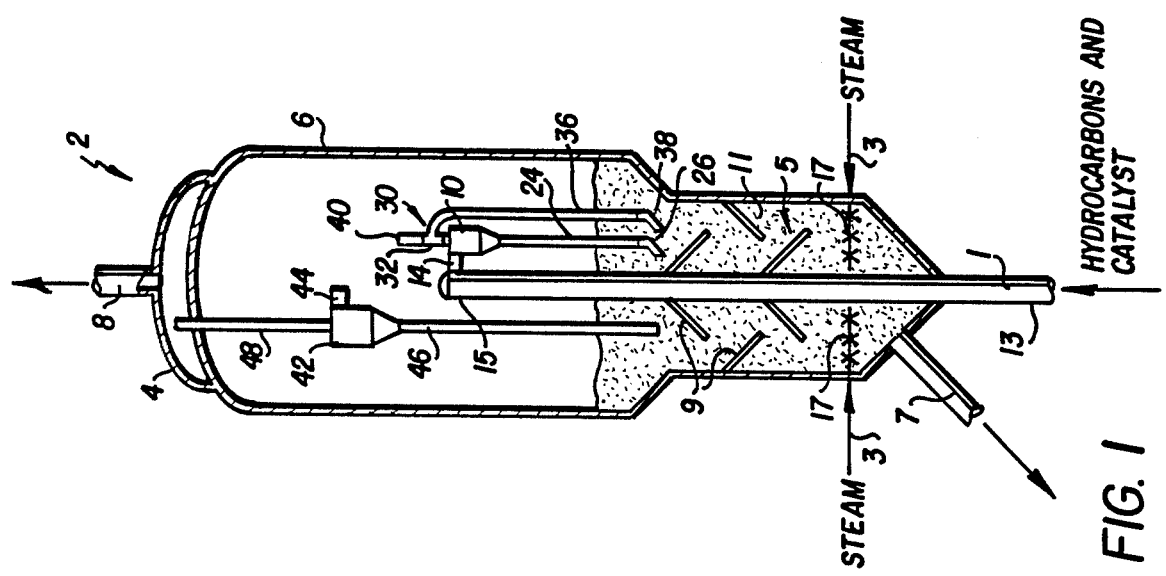
FIG. 1 is a schematic representaton of a fluid catalytic cracking reactor employing a first embodiment of the present invention.

FIG. 1 shows a fluid catalytic cracking reactor employing the rough-cut device of the present invention. In fluid catalytic cracking, a mixture of catalyst and hydrocarbons travel from an upstream end 13 of a riser conversion zone 1 to a downstream end 15 of the riser conversion zone 1. The downstream end 15 terminates in a reactor vessel 2 having a reactor chamber 6. The reactor vessel 2 and riser 1 operate at typical fluid catalytic cracking reactor and riser conditions, as known in the art. The riser 1 is attached to a cyclone inlet conduit 14, and conduit 14 is attached to a first cyclone 10. The mixture passes from the riser 1 through the cyclone inlet conduit 14 and into the first cyclone 10. The first cyclone 10 separates a first portion of catalyst from the mixture and passes the separated portion through the first cyclone dipieg 24. A downstream end of the cyclone dipleg 24 may be sealed either by being extended into a dense catalyst bed 11 or by a trickle valve 26. The remaining hydrocarbons and catalyst pass upwardly from the cyclone 10, as a cyclone overhead stream 20, through a cyclone gas outlet tube. The overhead stream 20 axially passes in spiral flow into the rough-cut device 30, where a second portion of catalyst is separated from the overhead stream 20. The rough-cut device 30 includes the cylinder 30 and a solids collector conduit 34. The remaining gases axially pass from the rough-cut device 30 to a gas outlet conduit 40, and from conduit 40 into the atmosphere of reactor chamber 6. The second portion of catalyst passes through a solid collection conduit dipleg 36, having a trickle valve 38, into a stripping zone 5 located in the bottom portion of the reactor vessel 2.

In the stripping zone 5, the separated catalyst mixes with catalyst bed 11 and passes countercurrently to steam provided by stream conduit 3 to steam header 17. The stripping zone 5 can be provided with trays or baffles 9, which can be disc and doughnut arranged, as shown on FIG. 1, and can be perforated or unperforated, as known in the art. A catalyst outlet conduit 7 is attached to the reactor vessel 2 in communication with the stripping zone 5. Stripped catalyst passes from the reactor vessel 2 through the catalyst outlet conduit 7 to a conventional regenerator vessel (not shown) for removing materials, such as coke which adheres to the catalyst, or hydrocarbons which remain with the catalyst.

Gases stripped from catalyst, and gases which passed through the atmosphere of reactor chamber 6, pass through a cyclone inlet conduit 44 into a second cyclone 42. In second cyclone 42, solids are separated from gases and the solids pass downwardly through a dipleg 46 into the catalyst bed 11, while the gases pass upwardly through a second cyclone gas outlet tube 48 into the reactor plenum chamber 4 and then out of the reactor through plenum chamber outlet conduit 8 to downstream processing, such as fractionation (not shown).

Figure 2:
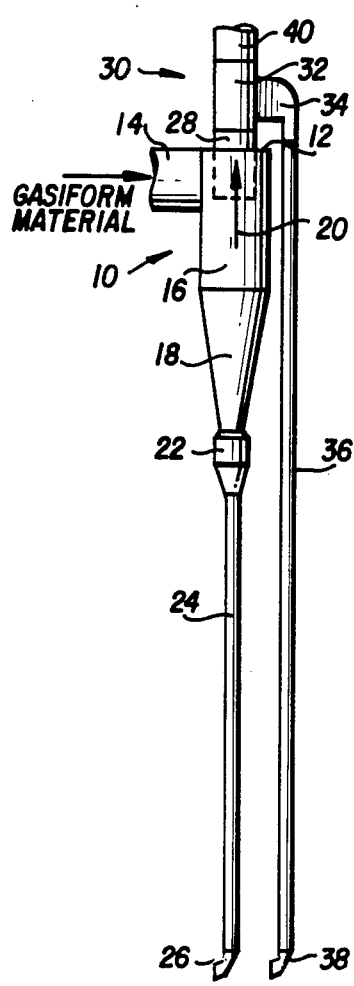
FIG. 2 is an illustration of the detail of the embodiment of the present invention of FIG. 1.

FIG. 2 illustrates details of the first cyclone 10. The cyclone 10 has the cyclone inlet conduit 14 attached to a cyclone barrel 16, which is cylindrical. The barrel 16 is attached to a cyclone bin 18, which is conical. A bottom bin 22 is attached to the bottom of the cyclone bin 18. The bottom bin 22 is attached to the dipleg 24, which is provided with the trickle valve 26. The cyclone 10 is also provided with a cyclone top wall 12 attached to the barrel 16 and to the cyclone gas outlet tube 28.

Figure 4:
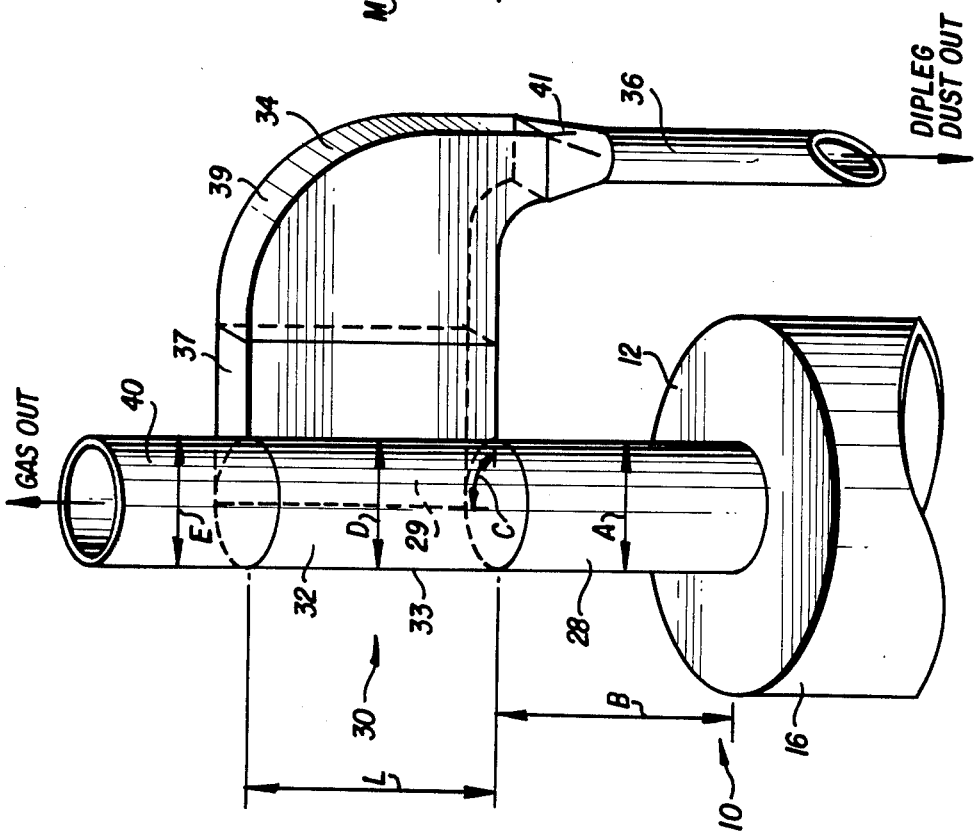
FIG. 4 is an enlarged view of the embodiment of the present invention of FIG. 1.

FIG. 4 further illustrates details of the first embodiment of the present invention. The cyclone top wall forms an annulus between the barrel and the cyclone gas outlet tube 28. The cyclone tube 28 is attached to the rough-cut device 30. The rough-cut device 30 includes a cylinder 32 having sidewalls 33 and the solids collector conduit 34 which is attached to the sidewalls 33. The cylinder 32 is also attached to the gas outlet conduit 40, as shown in FIG. 2.

The stream 20 (shown in FIG. 1) of gas and entrained solid particles passes upwardly through the cyclone gas outlet tube 28. The gas and solid particles stream 20 is in spiral flow upon exiting the riser cyclone 10 and axially passes in spiral flow through the tube 28 and the rough-cut device 30. The spiral flow of stream 20 drives the solids by centrifugal force to the walls of the tube 28 and cylinder 32. Thus, the solids concentrate along the walls and pass from the cylinder 32 through a tangential opening 29 into a shave-off conduit 37 of the solids collector conduit 34. The solids collector conduit 34 comprises the shave-off conduit 37 attached to the periphery of the tangential opening 29 and a curved conduit 39 attached to the shave-off conduit 37. The curved conduit 39 is attached to a rectangular-to-round connector funnel 41, which in turn is attached to the solids collection conduit dipleg 36.

Cylinder 32 should be located a distance B above the cyclone 10. The length of tube 28 between the cyclone 10 and the cylinder 32 equals distance B, and allows time for the catalyst to begin concentrating along the walls. The length L of the cylinder 32 provides additional time for the catalyst to concentrate along the walls so that it may exit through the tangential opening 29. Typically, tube 28 has a portion (not shown) which extends into the cyclone 10. Furthermore, attaching the cylinder 32 to the tube 28, rather than to the cyclone top wall 12, facilitates retrofitting an existing cyclone. Preferably, the distance B by which the cylinder 32 is spaced from the cyclone top wall 12 equals at least one-fourth an inside diameter A of the cyclone tube 28. Most preferably, the distance B equals at least one-half inside diameter A. The length L of the cylinder 32 ranges from one-half to two times the inside diameter A, preferably one-half to one times the inside diameter A. An arc C of the tangential opening 39 is at most one-fourth the circumference of the cylinder sidewalls 33. The length of the tangential opening 29 equals the length L of the cylinder 32. The cylinder 32 has an inside diameter D equal to the inside diameter A of the tube 28. The gas outlet conduit 40 also has an inside diameter E equal to the inside diameter A. Setting equal inside diameters for the tube 28, cylinder 32 and conduit 40 reduces the pressure drop through the system by preventing pressure losses due to expansion and contraction of gas flow cross-sectional area.

The first embodiment of the present invention has the advantages that it improves cyclone separation, while occupying a minimum of space, and causing only minimal increase in pressure drop between the tube 28 and conduit 40. Furthermore, it allows easy retrofit of existing cyclones to improve their efficiency.

Figure 5:
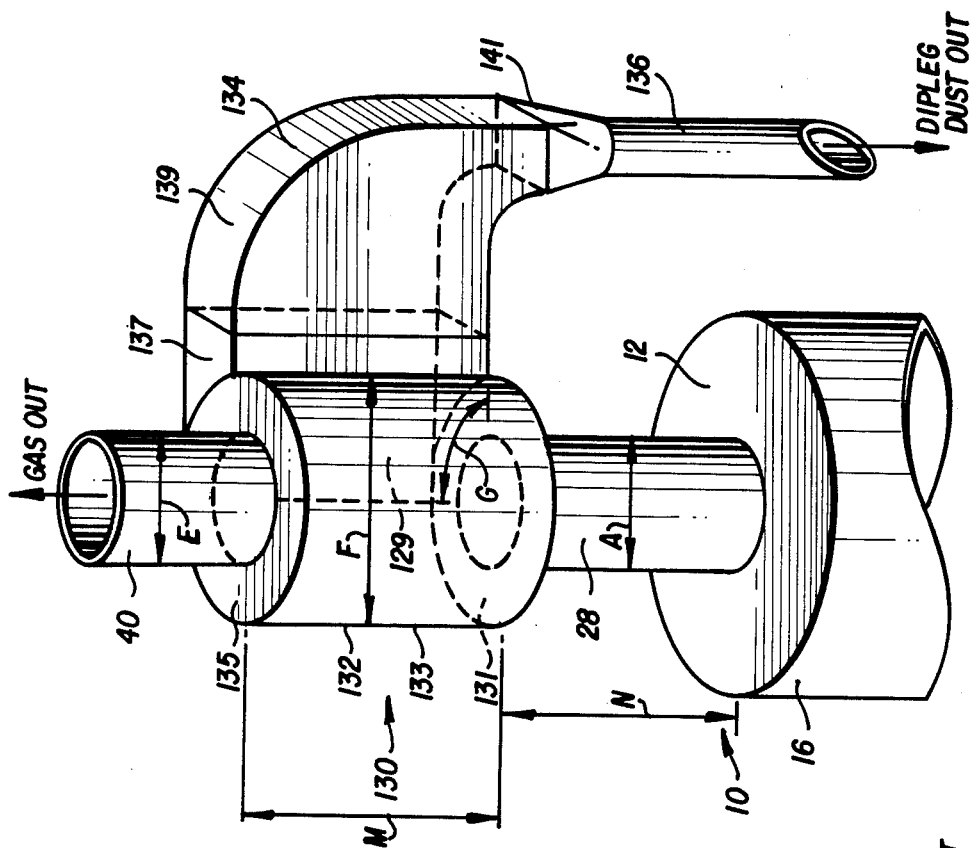
FIG. 5 is a view of second embodiment of the present invention.

In a second embodiment of the invention, shown in FIG. 5, a rough-cut device 130 has an inside diameter F greater than inside diameter A of the cyclone tube 28. The rough-cut device 130 includes a cylinder 132, including sidewalls 133, attached to an annular bottom wall 131 and an annular top wall 135. The tube 28 is attached to the bottom wall 131. The conduit 40 is attached to the top wall 135. Preferably, the inside diameter F of the cylinder 132 equals at least 1.33 times the inside diameter A. Most preferably, the cylinder 132 has an inside diameter F from 1.33 to 1.5 times the inside diameter A. Tube 28 and conduit 40 have equal inside diameters A, E, respectively.

The second embodiment illustrated in FIG. 5 operates similarly to the first embodiment illustrated in FIG. 4, in that a stream 20 of catalyst particles and gases from the cyclone 10 pass in spiral flow through tube 28 into the rough-cut device 130. The stream 20 passes in spiral flow through the rough-cut device 130 to concentrate the particles along the inside of sidewalls 133. The concentrated particles pass through a tangential opening 139 of the cylinder 130 into a solids collector conduit 134, which is attached to the sidewalls 133 at the periphery of the tangential opening 133. Conduit 134 is also attached to a solids collector conduit dipleg 136. The separated solids pass through the dipleg 136 to the catalyst bed 11 located below, as in FIG. 1. The solids collector conduit 134 includes a shave-off conduit 137, a tapered conduit 139, and a funnel 141. The shave-off conduit 137 is attached to the periphery of the tangential opening 129. Shave-off conduit 137 is also attached to the tapered conduit 139 equals the length M of the cylinder 132. funnel 141 is attached to the dipleg 136. The length of the tangential opening 139 equals the length M of the cylinder 132. The length M of the cylinder 132 ranges from one-half to two times the inside diameter A of the cyclone tube 28, preferably one-half to one times the inside diameter A of the cyclone tube 28. The arc G of the tangential opening 129 is at most one-fourth the circumference of the cylindrical sidewalls 133. As shown in FIG. 5, the gas outlet conduit 40 is flush with the cylinder top wall 135.

The cylinder 132 is attached to the tube 28 which extends above the cyclone top wall 12 by a distance N. Distance N is preferably equal to at least one-fourth of inside diameter A, and most preferably equal to one-half of inside diameter A. Distance N spaces the cylinder 132 from the cyclone top wall 12 to allow time for catalyst to concentrate due to centrifugal force.

Figure 6:
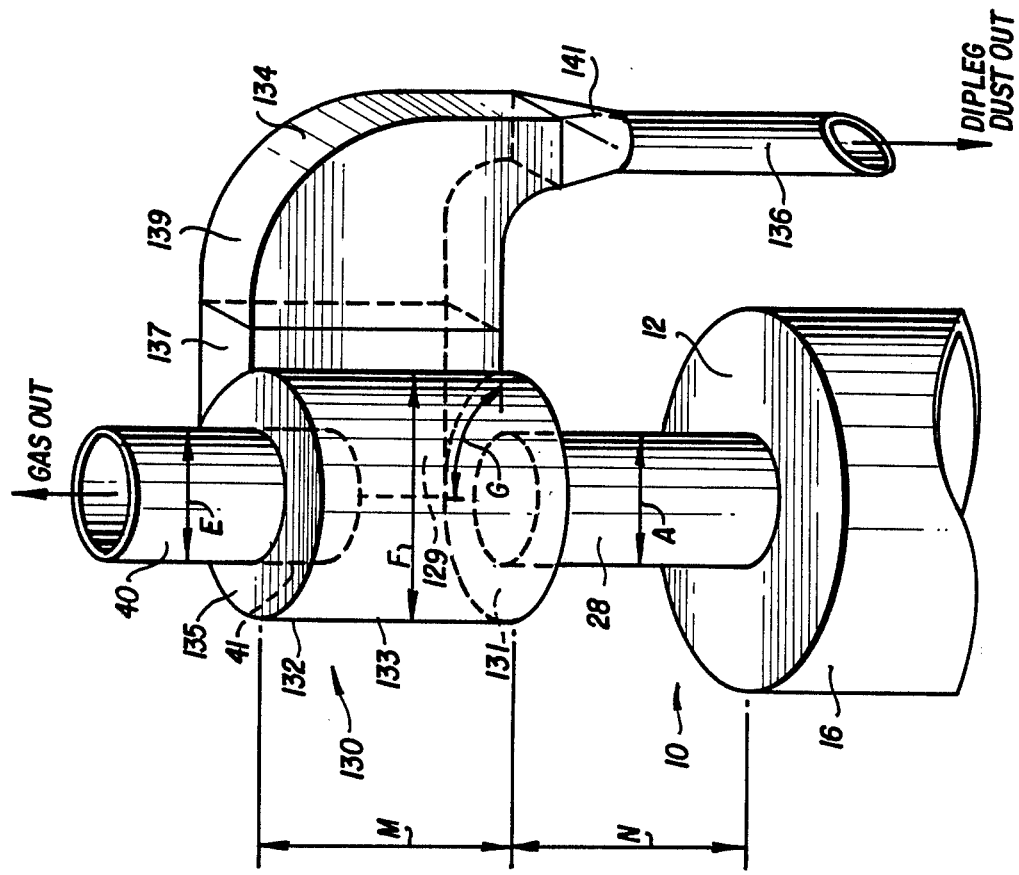
FIG. 6 is a view of a third embodiment of the present invention.

In a third embodiment, shown in FIG. 6, a portion 41 of the gas outlet conduit 40 is located within the cylinder 132. This facilitates separation by preventing reentrainment of solids concentrated along the sidewalls 133.

Figure 3:
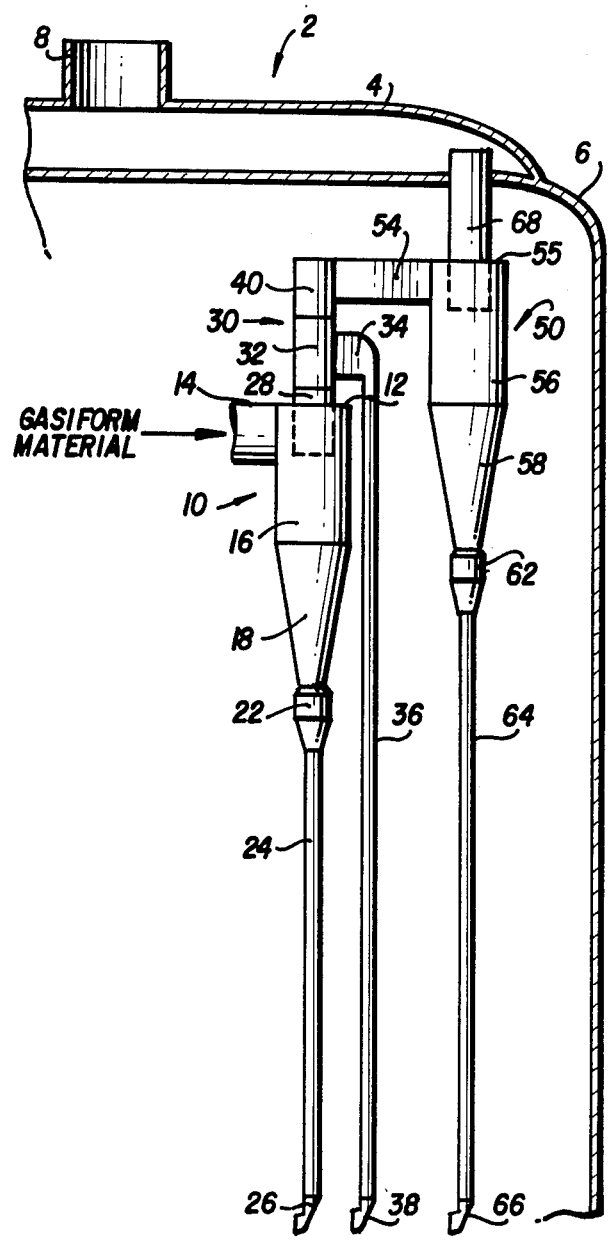
FIG. 3 is an illustration of the embodiment of the present invention of FIG. 2 employed in a multicyclone system.

The rough-cut device 30 or rough-cut device 130 can be attached to an existing single stage cyclone. In addition, the rough-cut device 30 or rough-cut device 130 can be attached in series with existing multi-stages of cyclones to improve overall collection efficiency. FIG. 3 shows the rough-cut device 30 employed with a multi-stage cyclone system, which includes the first cyclone 10 and a second cyclone 50. The second cyclone 50 includes a second cyclone barrel 56 attached to a second cyclone inlet conduit 54. The barrel 56 is also attached to a second cyclone top wall 55 and a second cyclone bin 58. The second cyclone bin is attached to a second cyclone bottom bin 62, which in turn is attached to a second cyclone dipleg 64. Second cyclone dipleg 64 is provided with a trickle valve 66.

The gas out conduit 40 is attached to the inlet conduit 54. The second cyclone 50 separates a portion of solids from the gas and solids stream from the gas out conduit 40, and passes the separated solids through dipleg 64.

The remaining gas, and any entrained particles, pass through a second cyclone tube 68 into the plenum chamber 4 and out of the reactor vessel 2 through the plenum chamber outlet conduit 8.

When the present invention is employed in a fluid catalytic cracking reactor vessel 2, the diplegs 24, 36 and 64 should be strong enough to withstand fluid catalytic cracking conditions. Therefore, in commercial operation, the diplegs 24, 36 and 64 are typically at least six inches in outside diameter. Furthermore, dipleg 36 must have a trickle valve 38 or other means for sealing the dipleg to maintain a pressure balance between first cyclone 10 and second cyclone 50.

It is particularly advantageous to employ the rough-cut device 30, 130 between two existing cyclones in a fluid catalytic cracking reactor, because the device 30, 130 adds minimal pressure drop and can withstand fluid catalytic cracking reactor conditions. The device 30, 130 is also advantageous when employed in a fluid catalytic cracking regenerator (not shown).

The present invention also includes a method for improving the efficiency of an existing cyclone. The efficiency is improved by retrofitting an existing cyclone to include either the rough-cut device 30 or rough-cut device 130 disclosed above. The method for improving the efficiency of the existing cyclone includes fabricating the rough-cut device 30, 130 to have the characteristics such as cylinder length L, M, cylinder inside diameter D, F, cylinder spacing from the cyclone B, N, as well as a tangential opening 29, 129 and solids collection conduit 34, 134, respectively, as disclosed above.

The method for improving the efficiency of an existing cyclone comprises attaching a cylinder to a downstream end of a cyclone gas outlet tube through which a cyclone overhead stream 20 comprising solids and gases pass in spiral flow. The cylinder may be either cylinder 32 of the first embodiment or cylinder 132 of the second and third embodiments. Cylinder 32 is fabricated to have the inside diameter D equal to that of tube 28. Cylinder 132 is fabricated to have sidewalls 133 attached to a top wall 135 and a bottom wall 131, as shown in FIG. 5. The inside diameter F of the cylinder 132 is greater than that of tube 28. Preferably, the inside diameter F is at least 1.33 times the inside diameter A of tube 28, most preferably 1.33 to 1.5 times that of tube 28.

Tube 28 extends a distance B, N, respectively, above the cyclone top wall 12, and the cylinder 30, 130, respectively, is attached to the downstream end of tube 28. Therefore, the cylinder 30, 130 is spaced the distance B, N, respectively, from cyclone top wall 12. Preferably, the distance B, N is at least equal to one-fourth the inside diameter A. Preferably, the distance B, N is at least equal to one-half the inside diameter A. Cylinder 32, 132 is fabricated to have a tangential opening 29, 129, which preferably has a length equal to the length L, M of cylinder 32, 132, respectively. The arc C, G of the tangential opening 39, 139, respectively, is at most equal to one-fourth the circumference of the cylinder 32, 132, respectively. The tube 28, cylinder 30 or cylinder 130, and gas outlet conduit 40 are axially aligned. The method also includes attaching a solids collector conduit 34, 134 tangentially to the periphery of the tangential opening 29, 129, respectively.

The gas outlet conduit 40 has an inside diameter E equal to the inside diameter A of tube 28. Conduit 40 can either be directly attached to the cylindrical sidewalls 33, as in FIG. 4, flush with the cylinder top wall 135, as in FIG. 5, or attached to the cylinder top wall 135 so a portion 41 of the gas outlet conduit 40 is located within the cylinder 132, as in FIG. 6.

The solids collector conduit 34, 134 is tapered, so it has a tapered conduit 39, 139 and funnel 41, 141, respectively. The conduit 34, 134 is attached to the dipleg 36, 136, respectively. The tapering reduces the gas which passes from the solids collector conduit 34, 134 to the dipleg 36, 136, respectively. The tapered conduit 39, 139 is rectangular, so gas entrained into the conduit 39, 139 can flow backwards therethrough, thus further preventing passage of gas down the dipl;eg 36, 136, respectively. It is particularly important to prevent passage of gas through the dipleg 36, 136, respectively, in closed cyclone systems employed within a fluid catalytic cracking reactor vessel. However, the present invention may be applied to any cyclone and is not limited to closed cyclone systems.

The present invention further includes a method for improving cyclone efficiency, by retrofitting an existing multistage cyclone system to include the rough-cut device, as in FIG. 3. For retrofitting a multi-stage cyclone system, the gas outlet conduit 40 is attached to the inlet conduit 54 of the second cyclone 50, and the dipleg 36 must be sealed by either the trickle valve 38 (as in FIG. 3) or by being extended into the dense catalyst bed 11 (such as that of FIG. 1).

The present invention has the advantage that it can be attached to an existing single-stage cyclone or a series of existing multi-stage cyclones to improve overall collection efficiency. The present invention improves overall collection efficiency in the existing space requirements and with lower pressure drop compared to an additional cyclone stage. The rough-cut device can also be part of a new, improved efficiency cyclone. The device has low pressure drop because the gases are not required to change direction and the gases carry less entrained solids after the improved separation. The embodiment illustrated in FIGS. 1, 2 and 4 has a particularly low pressure drop, because there are no pressure losses due to expansion and contraction of cross-sectional flow area as catalyst and gases pass from the cyclone tube 28, through the cylinder 32, and into the gas outlet conduit 40. The embodiment of FIG. 5 results in improved separation efficiency over a conventional cyclone. The embodiment of FIG. 6 extends the gas out conduit 40 into the rough-cut device to further improve separation efficiency.

The rough-cut devices may be easily retrofitted into an existing single-stage or multi-stage cyclone system by removing a portion of a cyclone gas outlet tube 28 and replacing it with the rough-cut device. The rough-cut device also has the advantage that it can withstand the high operating temperatures of fluid catalytic cracking and is compact so that it may be retrofitted into an existing space in a fluid catalytic cracking reactor.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended hereto.

We claim:

1. An apparatus for separating solid catalyst particles from gases in a fluid catalytic cracking unit and returning the separated catalyst particles to a bed of particles below the apparatus which comprises
   (i) a cyclone having a gas outlet tube through which a cyclone overhead stream comprising catalyst solids and gases pass in spiral flow.
   (ii) a cylinder having an upstream end and a downstream end wherein said cylinder has smooth internal side walls and an inside diameter at least equal to the inside diameter of said cyclone gas outlet tube, said cylinder being axially aligned and in communication with said cyclone gas outlet tube and comprising sidewalls defining an opening;
   (iii) a solids collector conduit tangentially attached to said sidewalls at the periphery of said opening;
   (iv) a gas outlet conduit attached to said downstream end of said cylinder, said gas outlet conduit being axially aligned with said cylinder and;
   (v) a solids discharge conduit attached to and extending downwards from the solids collector conduit for returning the collected solids to the bed of catalyst.

2. The apparatus of claim 1, wherein the length of said cylinder ranges from one-half to two times said inside diameter of said cyclone tube.

3. The apparatus of claim 2, wherein the arc of said tangential opening is at most one-fourth the circumference of said cylinder sidewall.

4. The apparatus of claim 3, wherein the length of said tangential opening equals the length of said cylinder and the length of said cylinder ranges from one-half to one times said cyclone tube inside diameter.

5. The apparatus of claim 4, wherein said cylinder has the same inside diameter as that of said cyclone tube.

6. The apparatus of claim 4, said cylinder comprising a cylinder top wall attached to said cylinder sidewalls, wherein said cylinder has an inside diameter greater than that of said cyclone tube.

7. The apparatus of claim 6, wherein said cylinder inside diameter is at least 1.33 times said cyclone tube inside diameter.

8. The apparatus of claim 7, wherein said cylinder inside diameter is 1.33 to 1.5 times said cyclone tube inside diameter.

9. The apparatus of claim 7, wherein said gas outlet conduit is flush with said cylinder top wall.

10. The apparatus of claim 7, wherein a portion of said gas outlet conduit is located within said cylinder.

11. The apparatus of claim 4 in which the cyclone includes a cyclone top wall, said cyclone gas outlet tube being attached to said cyclone top wall, said cylinder being axially aligned with said cyclone, said cylinder being spaced from said cyclone top wall by a distance of at least one-fourth said inside diameter of said cyclone gas outlet tube.

12. The apparatus of claim 11, wherein said cylinder is spaced from said cyclone top wall by a distance of at least one-half said inside diameter of said cyclone tube.

13. The apparatus of claim 1, wherein said solids collector conduit is tapered and attached to the solids discharge conduit.

14. The apparatus of claim 13, further comprising a fluid catalytic cracking reactor, wherein said cylinder is located in said fluid catalytic cracking reactor.

15. The apparatus of claim 1, wherein said gas outlet conduit is attached to an inlet conduit of a second cyclone 16. A fluid catalytic cracking apparatus, comprising: a fluid catalytic cracking reactor vessel;

a riser having a downstream end which terminates within said reactor vessel;

a cyclone located in said reactor vessel and including a cyclone top wall;

a cyclone gas outlet tube located in said reactor vessel and attached to said cyclone top wall, a portion of said cyclone tube extending above said cyclone top wall, thereby allowing a cyclone overhead stream comprising solids and gases to pass in spiral flow through said cyclone tube;

a cylinder located in said reactor vessel and including sidewalls attached to a cylinder top wall and a cylinder bottom wall, said cylinder bottom wall being attached to said cyclone tube, said cylinder being axially aligned with said cyclone and cyclone tube, said sidewalls defining an opening, said cylinder being spaced from said cyclone top wall by a distance at least one-half an inside diameter of said cyclone tube, said cylinder having an inside diameter of 1.33 to 1.5 times said inside diameter of said cyclone tube, the length of said cylinder ranging from one-half to one times said cyclone tube inside diameter;

a solids collector conduit located in said reactor vessel and tangentially attached to the perimeter of said opening, wherein the arc of said opening is at most one-fourth the circumference of said cylinder sidewalls, wherein said solids collector conduit is tapered and attached to a dipleg; and a gas outlet conduit attached to said cylinder top wall, said gas outlet conduit being axially aligned with said cylinder and having the same inside diameter as said cyclone tube, wherein a portion of said gas outlet conduit is located within said cylinder.

17. A method for separating a cyclone overhead stream comprising catalyst solids and gases from a cyclone gas outlet tube of a cyclone in a fluid catalytic cracking unit, the tube having a first inside diameter, wherein said overhead stream passes in spiral flow through said cyclone tube, comprising the steps of:

passing said cyclone overhead stream comprising said solids and gases from said cyclone tube axially in spiral flow through a cylinder comprising smooth internal sidewalls and having an inside diameter at least equal to that of said cyclone tube;

passing a separated solids stream comprising a portion of said solids tangentially out of said cylinder through a tangential opening in said cylinder sidewalls into a solids collector conduit attached to the periphery of said tangential opening; and passing a separated gas stream comprising a major portion of said gases and unseparated solids axially out of said cylinder into a gas outlet conduit attached to said cylinder, wherein said gas outlet conduit has an inside diameter equal to that of said cyclone tube.

18. The method of claim 17, wherein said cylinder through which said overhead stream passes has a length ranging from one-half to two times said cyclone tube inside diameter.

19. The method of claim 18, wherein said opening has an arc of at most one-fourth the circumference of said cylinder sidewall and said separated solids pass through said opening.

20. The method of claim 18, wherein said opening has a length equal to the length of said cylinder, wherein the length of said cylinder ranges from one-half to one times said cyclone tube inside diameter and said separated solids pass through said opening.

21. The method of claim 20, wherein said cylinder has the same inside diameter as that of said cyclone tube and said overhead stream passes through said cylinder.

22. The method of claim 20, said cylinder including a cylinder top wall attached to said cylinder sidewalls and having an inside diameter greater than that of said cyclone tube and said overhead stream passes through said cylinder.

23. The method of claim 22, wherein said cylinder has an inside diameter at least 1.33 times said cyclone tube inside diameter and said overhead stream passes through said cylinder.

24. The method of claim 22, wherein said cylinder has an inside diameter 1.33 to 1.5 times that of said cyclone tube and said overhead stream passes through said cylinder.

25. The method of claim 23, wherein said gas outlet conduit is flush with said cylinder top wall and said separated gas stream passes through said gas outlet tube.

26. The method of claim 25, wherein said gas outlet conduit is located within said cylinder and said separated gas stream passes through said gas outlet tube.

27. The method of claim 20, further comprising the steps of passing said overhead stream through a cyclone attached to said cyclone tube, wherein said cyclone has a top wall and said cyclone and cylinder are axially aligned, said overhead stream passing from said cyclone into said cylinder, through a portion of said cyclone tube extending above said cyclone top wall a distance of at least one-fourth said cyclone tube inside diameter.

28. The method of claim 27, wherein said distance which said overhead stream passes through said cyclone tube portion is at least one-half said cyclone tube inside diameter.

29. The method of claim 28, wherein said separated solids pass through a solids collector conduit which is tapered and attached to a dipleg.

30. The method of claim 29, wherein said separated gas passes from said gas outlet conduit into an inlet conduit of a second cyclone and a downstream end of said dipleg of said solids collector conduit is sealed.

31. A method for separating solids from gases in a cyclone overhead stream, which passes from a cyclone gas outlet tube having a first inside diameter, wherein said overhead stream passes in spiral flow through said cyclone tube, comprising the steps of:

passing said solids and gases, which later form said overhead stream through a cyclone having a top wall;

passing said overhead stream upwardly from said cyclone in spiral flow about said cyclone's longitudinal axis, through a portion of said cyclone tube, which extends above said cyclone a distance of at least one-half said cyclone tube inside diameter, into a cylinder having sidewalls;

passing said overhead stream in spiral flow through said cylinder, wherein said cylinder has a length ranging from one-half to one times said cyclone tube inside diameter, said cylinder being axially aligned with said cyclone tube, said cylinder having an inside diameter 1.33 to 1.5 times said cyclone tube inside diameter and said cylinder being attached to said cyclone tube;

passing a separated solids stream comprising a portion of said solids tangentially out of said cylinder through an opening in said sidewalls, into a solids collector conduit attached tangentially to the periphery of said opening, wherein the arc of said opening is at most one-fourth the circumference of said cyclone tube; and passing a separated gas comprising a major portion of said gases axially out of said cylinder into a gas outlet conduit attached to said cylinder, said gas outlet conduit having the same diameter as said cyclone tube.

32. An apparatus according to claim 1 in which the solids collector conduit includes a horizontal conduit portion which is tangentially attached to the sidewalls of the cylinder at one end and attached at the other end to a curved portion having a downwardly directed solids outlet at the end remote from the horizontal portion.

33. An apparatus according to claim 1 in which the inside diameter of the gas outlet conduit is the same as that of the cyclone gas outlet tube.

* * * * *